(12) United States Patent
Kindt

(10) Patent No.: US 6,921,553 B2
(45) Date of Patent: Jul. 26, 2005

(54) NON-IONIC FOAM COMPOSITION FOR TREATING ASBESTOS-CONTAINING MATERIALS AND METHOD OF USING SAME

(75) Inventor: Lawrence Joseph Kindt, Sykesville, MD (US)

(73) Assignee: W.R. Grace & Co.-Conn., Columbia, MD (US)

( * ) Notice: Subject to any disclaimer, the term of this patent is extended or adjusted under 35 U.S.C. 154(b) by 61 days.

(21) Appl. No.: 10/421,510

(22) Filed: Apr. 23, 2003

(65) Prior Publication Data

US 2004/0018302 A1 Jan. 29, 2004

Related U.S. Application Data

(62) Division of application No. 09/740,951, filed on Dec. 21, 2000, now Pat. No. 6,589,156.

(51) Int. Cl.$^7$ ................................................. B05D 7/00
(52) U.S. Cl. ........................ 427/244; 427/243; 427/399
(58) Field of Search ................................ 427/226, 227, 427/243, 244, 399

(56) References Cited

U.S. PATENT DOCUMENTS

| | | | |
|---|---|---|---|
| 4,328,197 A | 5/1982 | Flowers | 423/167.1 |
| 4,338,374 A | 7/1982 | Neser | 428/411 |
| 4,347,150 A | 8/1982 | Arpin | 510/110 |
| 4,401,636 A | 8/1983 | Flowers | 423/167.1 |
| 4,474,742 A | 10/1984 | Graceffa et al. | 423/331 |
| 4,693,755 A | 9/1987 | Erzinger | 134/4 |
| 5,207,932 A * | 5/1993 | Norman et al. | 252/3 |
| 5,258,562 A | 11/1993 | Mirick et al. | 588/242 |
| 5,266,690 A | 11/1993 | McCurry, Jr. et al. | 536/18.6 |
| 5,449,763 A | 9/1995 | Wulff et al. | 536/18.6 |
| 5,512,666 A | 4/1996 | McCurry, Jr. et al. | 536/18.6 |
| 5,633,359 A | 5/1997 | Beaulieu | 536/18.6 |
| 5,741,358 A | 4/1998 | Hartman | 106/699 |
| 5,743,841 A | 4/1998 | Block et al. | 588/254 |
| 5,753,031 A | 5/1998 | Block | 106/699 |
| 5,753,032 A | 5/1998 | Block | 106/699 |
| 5,753,033 A | 5/1998 | Block | 106/699 |
| 5,753,034 A | 5/1998 | Block | 106/699 |
| 5,753,035 A | 5/1998 | Block | 106/699 |
| 5,859,218 A | 1/1999 | Wulff et al. | 536/18.6 |
| 6,458,423 B1 | 10/2002 | Goodson | 427/403 |

* cited by examiner

*Primary Examiner*—Timothy Meeks
(74) *Attorney, Agent, or Firm*—Howard J. Troffkin

(57) ABSTRACT

A composition for transforming a chrysotile asbestos-containing material into a non-asbestos material is disclosed, wherein the composition comprises water, at least about 30% by weight of an acid component, at least about 0.1% by weight of a source of fluoride ions, and a stable foam forming amount of a foaming agent system composed of a non-ionic alkyl polyglycoside alone or with additional non-ionic foaming agents. A method of transforming the asbestos-containing material into a non-asbestos material using the present composition in the form of a foam also disclosed.

13 Claims, 2 Drawing Sheets

NON-IONIC FOAM COMPOSITION FOR TREATING ASBESTOS-CONTAINING MATERIALS AND METHOD OF USING SAME

This is a division of application Ser. No. 09/740,951, filed Dec. 21, 2000, now U.S. Pat. No. 6,589,156.

BACKGROUND OF THE INVENTION

This invention relates to methods and compositions for digesting of asbestos (such as, chrysotile asbestos) into a non-asbestos material while the asbestos is a component of a gypsum-containing cementitious composite, and especially to methods and compositions for the in-place digestion of chrysotile asbestos present in composite material that is bonded to a support structure.

Chrysotile asbestos is a serpentine asbestos fibrous-like material consisting of alternating layers of silica and magnesium oxide/hydroxide bound to each other through covalently shared oxygen.

At least in part because of its availability and unique fire resistance and thermal properties, chrysotile asbestos has been used commercially in a variety of building products, including, for example, fire resistant roofing shingles, acoustical plasters, fire resistant and thermally insulating coating compositions and the like. In the formation of fire resistant coating compositions, found to be appropriate for treatment by the present invention, small amounts of chrysotile asbestos were mixed with a settable bonding material comprising gypsum (e.g., calcium sulfate hemihydrate) and, optionally, other materials such as vermiculite and the like. The composition was then applied to a structure where it forms a hardened coating. For example, such compositions found considerable use in multi-story buildings in which the gypsum containing composition was applied as an adherent coating to steel girders, floor support plates, concrete decking and the like to provide fire resistant and high-temperature thermal insulation properties which aid in preventing damage and even possible collapse of such buildings in the event of fire.

In recent years asbestos has been classified as a regulated material in the United States. Federal, state and local government agencies have promulgated regulations dealing with the use and disposal of asbestos-containing building materials. The U.S. Environmental Protection Agency ("EPA") has defined asbestos-containing material ("ACM") as a material which contains greater than one percent (1%) asbestos and requires special handling of such material. In accordance with various regulatory procedures, various safeguards are employed. to protect workers from inhaling asbestos fibers during removal or demolition activities. Examples of such safeguards include requiring workers to wear approved respirator or breathing apparatus, as well as protective clothing, requiring any area in a building in which asbestos-containing material is being removed to be isolated or enclosed from the remainder of the building, and requiring the enclosed work area to be kept at a negative pressure by the use of special apparatus equipped with HEPA filters to prevent airborne asbestos fibers from leaving the work area. Such isolation of the work area is an expensive and time-consuming part of the process.

Generally, prior art methods for handling asbestos-containing building materials have taken several approaches. One approach has been to chemically alter asbestos fibers before using them in building products. This approach is discussed, for example, in U.S. Pat. Nos. 4,328,197 and 4,401,636 both to Flowers, and in U.S. Pat. No. 4,474,742 to Graceffa et al.

Graceffa et al. (U.S. Pat. No. 4,474,742) teach treatment of asbestos with hydroxamic acid and iron chelating agents to remove the iron present in the asbestos based on the presumption that the iron is the harmful component. In the Flowers Patents (U.S. Pat. Nos. 4,328,197 and 4,401,636), one is taught to contact asbestos fibers with an aqueous solution of a weak base/strong acid or a strong base/weak acid salt of manganese, chromium, cobalt, iron, copper or aluminum or mixtures thereof, to convert the asbestos fibers into a metal-micelle product. In general, the process contemplated by Flowers is effected by preparing a slurry of asbestos fibers in an aqueous solution of the appropriate salt, effecting the conversion of the asbestos fibers to metal-micelle fibers in the slurry, and recovering the metal-micelle fibers from the slurry for use in the subsequent preparation of the desired fiber-containing end product.

Another approach is to treat previously formed asbestos-containing building materials by encapsulating the materials to thereby prevent the asbestos fibers from becoming airborne. A resinous encapsulating coating material typically would be applied by spraying, brushing or troweling. Care must be taken when using encapsulating methods so as not to physically damage the building material being encapsulated. Encapsulation is a containment method and, thus, the encapsulated asbestos material remains in place during the life of the building.

A number of removal techniques have been proposed, and each has its advantages and disadvantages. For example, it has been proposed to simply scrape or chip away at dry untreated asbestos-containing material and to collect the scraping for discard. This technique, which is referred to as dry removal, is generally considered unacceptable by regulatory authorities since it provides no safeguard against the release of airborne asbestos particles.

Dry vacuum methods have been attempted to overcome the problems of simple dry removal by incorporating an exhaust filtering system to prevent pollution to the outside environment and by using sealed containers for storing and discarding the collected asbestos-containing material. One of the disadvantages of this dry vacuum method is that the bond between the dry building material and the underlying surfaces on which it is coated may be stronger than the vacuum capabilities of the equipment. In those cases, it is necessary to dislodge at least a portion of the asbestos-containing material by scraping or chipping, which has the same limitations as the dry removal process described above.

Wet removal processes have been developed as a means for reducing the problems associated with the various dry removal techniques. Wet removal generally involves wetting a building material with water or water-surfactant solution to soften it and to thereby facilitate its removal. Wet removal clearly represents an improvement over dry removal. However, the use of water as a softening agent is not entirely satisfactory because water penetrates slowly, does not completely wet most building materials, and tends to run off the surfaces being treated.

Over the past several years, wet removal techniques have been improved by devising more effective wetting and/or softening compositions. Recent U.S. patents which relate to such improved wet removal techniques include, for example, U.S. Pat. No. 4,347,150 to Arpin; U.S. Pat. No. 4,693,755 to Erzinger; and U.S. Pat. No. 5,258,562 to Mirick et al.

The Arpin patent discloses a technique for wetting and removing friable insulting materials from an underlying substrate using a two-part wetting system. The first component of the system comprises an aqueous alkali metal silicate dispersion blended with a cationic or nonionic surfactant and the second component comprises a mixture of an acrylic latex and a reagent that is reactive with the alkali metal silicates in the first part. The two parts are stored separately and are mixed shortly before use to form a stripping composition, which facilitates the removal of the building material while encapsulating the individual asbestos fibers contained therein. The removed material must be handled as an asbestos-containing material.

The Erzinger patent exemplifies a wet method for removing asbestos-containing materials from a substrate. This patent discloses applying a composition containing a cellulosic polymer to the asbestos-containing material, allowing the cellulosic polymer-containing composition time to penetrate and wet the asbestos-containing material, removing the wet material from the underlying substrate by mechanical forces, and collecting the removed material for discard.

The Mirick et al. patent is centered on the concept of removing asbestos fiber containing building material by applying a dilute aqueous solution of an acid, which may include a separate source of fluoride ions such as an alkali metal or ammonium salt of hydrofluoric acid to the building material for the purpose of conditioning the material to aid in its removal while partially converting the asbestos fibers. The building material, after having been treated with the dilute acid solution, is preferably removed for further treatment and/or discard. Mirick et al. further contemplate that the wet building material, once removed, can then be digested by immersing the material into a bath of an acid solution, preferably with heating and agitation, until all of the asbestos material has been destroyed.

Several problems are associated with the wet removal techniques. The treatment solutions are conventionally applied to the building material by spray or brush application. These application techniques have an abrasive quality, which may dislodge at least a portion of the surface of the building material causing some asbestos fibers to become airborne. Further, such application can provide delivery of only small amounts of the active materials on a per pass basis. Attempts to apply greater amounts on a per pass application merely causes run-off of the excess over that which the building material is capable of absorbing within the application time. Thus, even attempts to totally wet a material is difficult to achieve and requires, at least, multiple applications of limited amounts. Finally, the conventional means of applying liquid to asbestos-containing materials do not provide a way to control dosage.

More recently, several compositions have been disclosed that are capable of treating asbestos containing building materials so that the treated material transforms into a non-asbestos containing material while being retained as part of the building structure. These compositions are disclosed in U.S. Pat. Nos. 5,753,031; 5,753,033; 5,753,034; 5,753,035; and 5,741,358. The teachings of these patents are incorporated herein in their entirety by reference.

Although the recently disclosed digestion compositions provide a means for converting asbestos containing material to a non-asbestos material while in place, there still remains concern with the mode of application of such compositions to the asbestos-containing material so as not to dislodge the building material being treated causing some asbestos fibers to become airborne. U.S. Pat. Nos. 5,741,358; 5,753,032; and 5,743,841 suggest applying foam compositions made up of the acidic digestion composition and foaming agents having certain ratio of cationic and non-ionic functionality. These foam compositions provide a means of "softly" applying the digestion composition to the asbestos containing building material. However, they have certain drawbacks, namely, they require the foaming composition to be applied through a multi-phase static aerator while using high pressure apparatus. They may exhibit high degrees of drainage from the foam when using commercially acceptable amounts of foaming agent.

It is desired to have a means of applying a composition capable of transforming chrysotile asbestos containing material to a non-regulated material in an effective and efficient manner.

SUMMARY OF THE INVENTION

Figure 1:
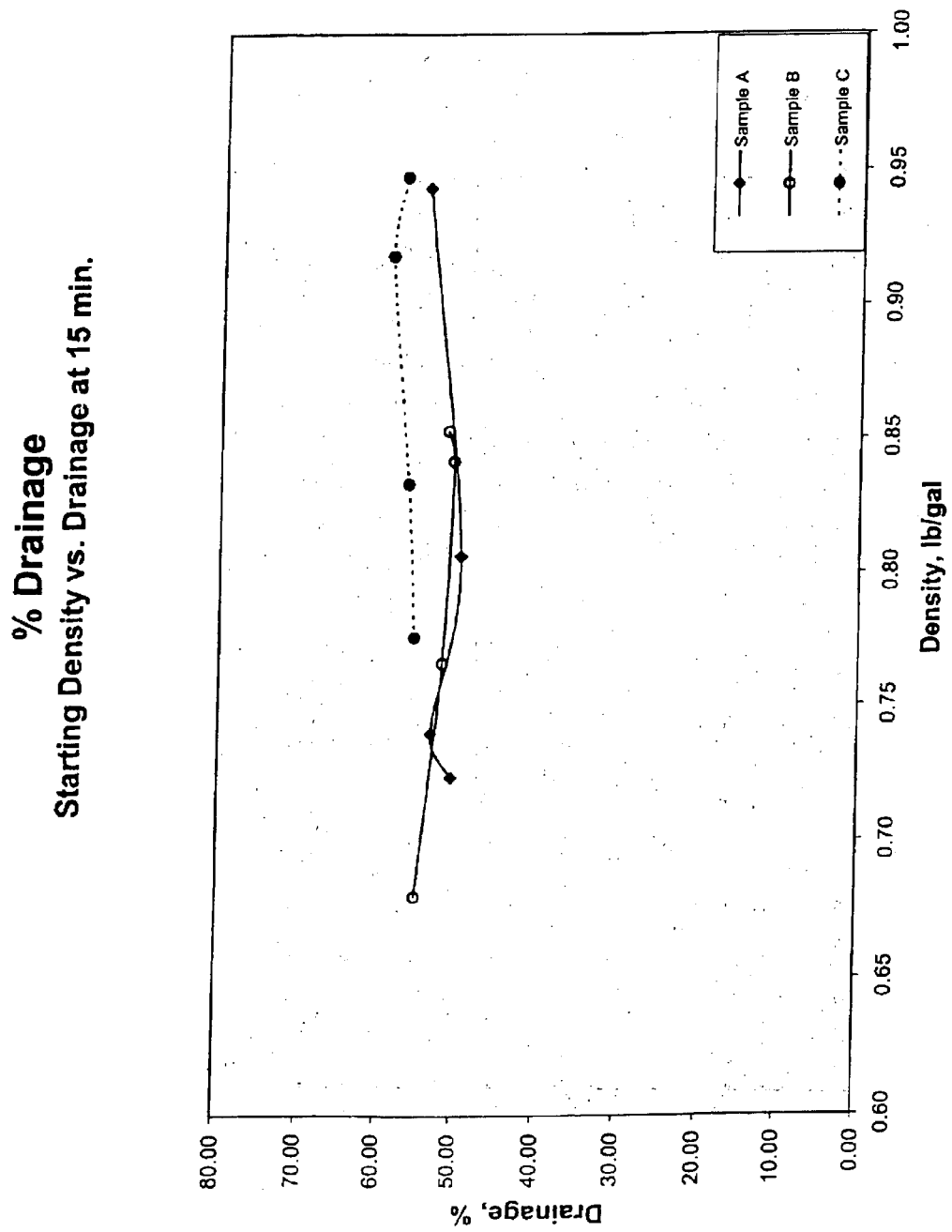
FIG. 1 is a graph showing the degree of drainage of test samples at varying densities. This FIG. 1 includes a comparative test sample of a combination of cationic and non-ionic foaming agents described in U.S. Pat. No. 5,743,841.
Figure 2:
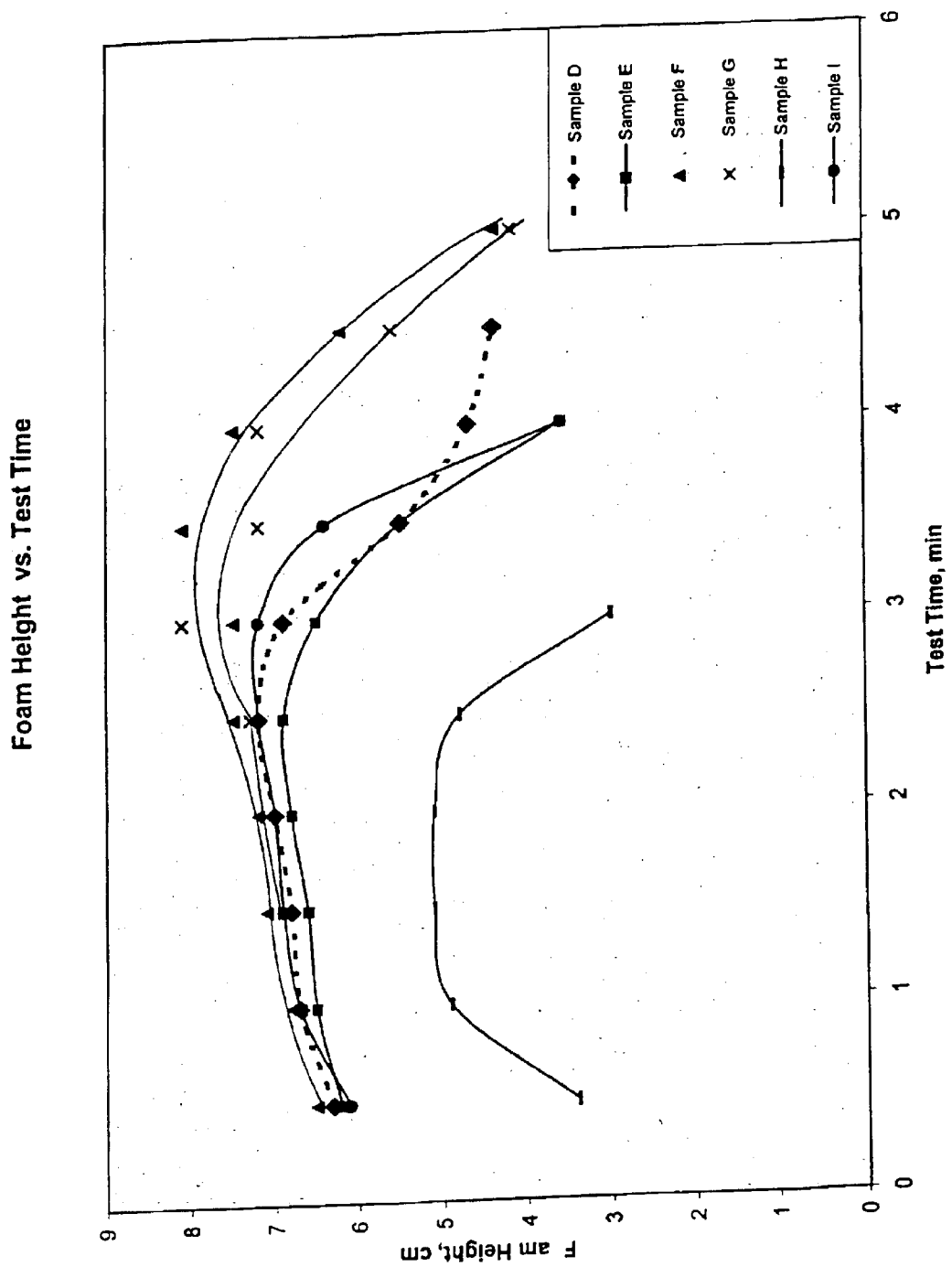
FIG. 2 is a graph of foam height (inversely related to density) over time for a number of samples including comparative sample of cationic and non-ionic foaming agents, as described in U.S. Pat. No. 5,743,841.

It is an object of the present invention to provide an improved composition and method for treating porous inorganic building materials which contain asbestos, particularly chrysotile asbestos, to transform the building materials to non-asbestos materials (i.e., materials which contain less than 1% by weight asbestos), while the building materials remain part of the building environment and supported on an underlying substrate.

Another object is to treat a building material which contains gypsum, chrysotile asbestos and, optionally, other components, such as porous aggregate particulate as, for example, vermiculite, while part of a building structure, to transform the building material into a non-regulated material, with an acid treating composition that contains an acid-stable foaming agent system in an amount sufficient to provide a stable foamed treating composition that can be applied using low pressure apparatus having reduced aerator components and that is capable of exhibiting low drainage while adhering to and soaking into the building material being treated. The system, thereby, provides a mode of applying the acid treating composition in an effective manner.

In accordance with the invention, these and other objects and advantages are achieved by the present compositions and method for transforming asbestos material (e.g., chrysotile asbestos) to non-asbestos material. The compositions comprise a unique combination of (i) water, a high concentration of an acid component comprising an inorganic acid, inorganic acid salt or mixtures thereof, with a minor amount of a fluoride ion source (preferably a tetraflouroborate or hexafluorosilicate salt), or, alternatively, (ii) an aqueous solution having at least one tetrafluroborate or hexafluorosilicate salt or mixtures thereof in high concentrations. The compositions further contain an acid stable foaming agent system comprising a non-ionic alkyl polyglycoside alone or in combination with other non-ionic agents. The present composition is applied to the chrysotile asbestos-containing materials, particularly chrysotile asbestos-containing building materials, in the form of a stable foam which permits absorption of from about 8 to 20 parts by weight of treating composition per part by weight of chrysotile asbestos in the material being treated.

DETAILED DESCRIPTION OF PREFERRED EMBODIMENTS

The present invention is intended for the treatment of porous inorganic cementitious materials, which contain asbestos fibers, to transform the building materials to non-asbestos materials. The present invention is especially useful for digesting chrysotile asbestos fibers contained in gypsum-based building materials that have been previously applied to the structural components, such as steel beams, decking and the like to buildings as coatings thereon to provide fire and heat resistance thereto. Although the present composition may be used to digest and transform various asbestos minerals contained as part of a building material into non-asbestos products. The present invention shall be described using chrysotile asbestos containing materials.

The present invention provides a treating composition, which is an aqueous solution or dispersion in the form of a stable foam. The foaming agent system described herein has been unexpectedly found to be capable of carrying a high quantity of an aqueous system having agents capable of digesting chrysotile asbestos while in place as part of a cementitious building material, of being applied using low pressure equipment, of adhering to said building material as applied, delivering and transferring the aqueous system to the cementitious building material without loss of foam integrity and without substantial loss of the aqueous system to the building environment.

The aqueous system may comprise (i) a high concentration of an acid component (i.e., an inorganic acid, an inorganic acid salt or mixtures thereof), and a relatively low concentration of a fluoride ion source (e.g., a tetrafluoroborate or a hexafluorosilicate salt) or, alternatively, (ii) a high concentration of a tetrafluoroborate or hexafluorosilicate salt or mixtures thereof, as described herein below and in the above referenced patents.

The subject compositions contain a unique foaming agent system composed of at least one non-ionic agent described below alone or in combination with other non-ionic agents in an amount capable of maintaining the treating the composition in the form of an acid stable foam, as fully described herein below.

The present foam may deliver an aqueous system having a high inorganic acid content. In such a system, the acid component can be selected from any strong inorganic acid, or an inorganic acid salt, or mixtures thereof The acid component should have a pKa of up to about 2.5 and preferably up to about 2.2. Further, the acid component must be highly soluble in water to form the present composition. Preferred inorganic acids include, for example, sulfuric acid, nitric acid, hydrochloric acid, phosphoric acid and mixtures of such acids. The most preferred acid is phosphoric acid. When phosphoric acid is employed as the acid component, it can be used in combination with small amounts of up to about 20% by weight of the total acid content, of other inorganic acids. In addition, small amounts (up to about 5%, preferably up to about 2%, by weight of the acid content) can be in the form of an organic acid. The preferred inorganic acid salts are half acid salts as, for example, ammonium and alkali metal bisulfate and the like. The preferred salts are the ammonium salts of the half acids.

The acid component is employed in the present composition in high concentrations of at least about 30% by weight, based on the weight of the treating compositions, up to the saturation point of the acid in the aqueous system. It is preferred that the acid component be present in from about 30% to about 45% by weight, based on the total weight of the treating composition.

The acidic aqueous treating composition may further contain at least one source of fluoride ions, typically a fluorine-containing salt which is soluble in the aqueous treating compositions in the amounts described hereinbelow. Fluorine-containing salts which may be used in the present treating compositions include, for example, fluorides, bifluorides, fluoroborates, and fluorosilicates of ammonia, alkali metals and alkaline earth metals. Mixtures of such salts also may be used. The preferred fluorine-containing salts are ammonium, alkali metal, or alkaline earth metal fluoroborates or fluorosilicates, such as ammonium tetrafluorosilicate, ammonium hexafluorosilicate, sodium tetrafluoroborate, sodium hexafluorosilicate, potassium tetrafluoroborate or potassium hexafluorosilicate. It has unexpectedly been found that by employing the preferred fluoroborate and fluorosilicate salts, the treating compositions of the present invention can be stored and used to transform chrysotile asbestos-containing building materials to non-asbestos materials while in place in a building environmental without generating noxious hydrogen fluoride gas in amounts which are unacceptable for commercial applications, as exemplified by OSHA standards. Thus, such salts of tetrafluoroborate and/or hexafluorosilicate are preferred over asbestos treating compositions which contain simple fluoride salts, such as sodium fluoride, ammonium fluoride or ammonium bifluoride, which tends to rapidly generate and expel large quantities of hydrogen fluoride gas when used, thus creating a dangerous work area.

When a fluoride ion source is optionally used in the treatment compositions of this invention, the amount is very small relative to the concentration of the acid component. Thus, concentrations of the fluoride ion source should be up to about 4%, preferably up to about 2% by weight, based on the total weight of the treating compositions, with concentrations of from about 0.1% to about 4% by weight, e.g., from about 0.5% to about 2% by weight, being most preferred.

Alternately, the present invention can be used to deliver an aqueous digestion composition formed from water and a tetrafluoroborate or hexafluorosilicate salt. The salt is preferably in the form of an alkali metal, alkaline earth metal or ammonium salt. The salt is normally present in at least about 10 weight percent of the aqueous solution. The salt solution may, optionally, further have small amounts of an inorganic acid such as in amounts of up about 7 wt. percent, preferably up to about 5 wt. percent and most preferably up to about 2 wt. percent based on the total weight of the aqueous system. The aqueous digestion compositions composed of the subject salt are fully disclosed in U.S. Pat. No. 5,753,034, the teachings of which are incorporated herein in its entirety by reference.

In addition to the digestion components described above, the present treating compositions must contain an acid stable foaming system composed of at least one alkyl polyglycoside. This non-ionic agent may be used alone or in combination with other non-ionic agents to provide the improved highly acidic treating compositions of this invention. The non-ionic agents described herein below have been found to effectively form a stable foam composition capable of delivering the aqueous solution digestion agents into a cementitious material, to provide said delivery using low pressure equipment and to exhibit low degrees of drainage of the aqueous digestion system over sustained periods of time.

The foaming agent system selected for use in the present treating compositions must be capable of imparting several critical properties to the treating compositions. For example, the selected foaming agent system must enable the treating composition to form a stable foam under low pressure conditions. For example, the combined liquid agents of the present invention used to form the applied foam are capable of delivery using low pressure equipment (capable of generating and withstanding about 120 psi or less, such as about 100 or even 90 psi). The gas (e.g. air) causing the resultant foam can be delivered by a low pressure pump system capable of developing pressures of about 60 or even 50 psi. These presures can be developed using light, readily transportable equipment convenient for field operations. In comparison, foam systems described in U.S. Pat. No. 5,743,841 require multi-phase aerators and delivery pressures of 500 to about 1000 psi.

As used in this specification and claims, the term "stable foam" is meant to define a relatively dense foam (density of at least about 0.05 to 0.4 g/cc and preferably from about 0.05 to 0.15 g/cc) that is capable of existing in a highly acidic environment. Further, the foaming agent system must be capable of forming a foam which is capable of adhering to cementitious building material and the like no matter what the orientation of the building material (e.g., horizontal, vertical, floor, ceiling). Still further, the foaming agent system must be capable of maintaining its integrity while it releases and provides it aqueous system to enter into the pores of the cementitious building material (e.g., the foam must be capable of existing for a sufficient time to permit penetration without undo drainage, as for example, at least 1 minute, preferably at least about 2 minutes, and most preferably at least about 10 minutes after application) to provide the aqueous treating composition sufficient time to enter into the building material without causing significant drainage to the environment.

It is readily seen that the above needs have counter balancing forces, and therefore, it is unexpected that a foam composition presently described can be achieved.

The foaming agent system also should provide the foamed treating composition with high cohesive and adhesive properties. In other words, the foamed treating composition should have enough cohesive strength to hold itself together as a mass with semi-solid (pseudoplastic) rheological properties, and enough adhesive strength to adhere to the asbestos-containing material being treated in the form of a relatively thick foam layer. Thus, a foam treating composition in accordance with this invention should have sufficient adhesive strength to adhere as a layer of foam of from about 0.5 to about 2 inches in thickness to a building material disposed on a vertical or inverted building structure, e.g., an I-beam, with little if any run-off.

The high cohesive and adhesive properties of the present foamed treating composition enable the application of a relatively large quantity of treating composition in a single application. In other words, when the present foamed treating compositions are employed to treat an asbestos-containing building material, such as a thick fireproof coating material disposed on a structural beam in a building, the compositions may be applied in a single application as a relatively thick layer of foam, e.g., 1 to 2 inches thick, or with only a few passes which can remain in contact with the building material for an extended period of time. This represents a significant improvement over the use of treating compositions in the form of an aqueous solution or dispersion, which typically must be sprayed or otherwise applied onto a building material in multiple, small dosage applications in order to permit the requisite amount of treating composition to soak into the material being treated while avoiding run-off.

In addition to the high cohesive strength and high adhesive strength achieved by the present foam treating compositions, the present foaming agent system provides resultant foam compositions which are capable of being readily absorbed into the building materials being treated. Thus, the present foaming agent system is capable of lowering the contact angle of the treating composition with respect to the building material being treating while maintaining its surface tension to at least 30 dynes/cm and preferably at least about 40 dynes/cm. Thus, the present foamed treating composition is capable of wetting and soaking into a building material faster than liquid drains from the foam under the influence of gravity. This is important inasmuch as it is necessary for the treating composition to soak into the building material, without any significant drainage or run-off, so that the chrysotile asbestos located in the interior and otherwise unexposed portions of the building material, as well as the chrysotile asbestos located adjacent to or at the exposed surfaces, will be contacted with the acid treating composition and thereby transform the asbestos containing material into a non-regulated material.

It will be appreciated that the time that it takes for a given foam treating composition to soak into a given building material sets a lower limit for the acceptable stability of the foam. In other words, a faster-wetting foam need not be as stable as a slower wetting foam. It will be further appreciated that the required stability of a particular foam treating composition will vary depending upon its exact formulation, as well as to the particular building material to be treated. In practice, however, it has been found that foam treating compositions in accordance with the present invention are stable enough to exist for at least about 1 minute, and preferably for at least about 2 minutes which is sufficient time duration for the treating composition to be absorbed into at least the portion of the treated material's thickness adjacent to the exposed surface upon which the composition is applied. The composition will then travel through the remainder of the thickness over time.

Because the treating compositions of the invention have a pH of 2 or less, the foaming agent systems that are suitable for use in the present treating composition must be stable at very low pH conditions. Accordingly, many agents that would be useful for generating a foam composition at a neutral or slightly acidic pH conditions, lose their functionality or decompose in some way under such low pH conditions and, therefore, may not be suitable for use in the present invention. The present foaming agents have been found stable at the low pH conditions of the present contemplated treating composition. Thus, the foaming agents may be mixed with the other components of the treating composition to form a storage stable composition. Alternately, the foaming system can be added to the treating composition immediately prior to foam formation and application to a building material.

It has been unexpectedly found that particularly suitable foaming agent systems for use in the present invention provide a combination of foaming and wetting properties. Thus, preferred foaming agent systems comprise one or a combination of certain substantially non-ionic agents, as described herein below. The relative amounts of the agent or agents having non-ionic functionality to be used with a particular treating composition will depend on the components of the treating composition as well as the particular equipment being used to produce the foam and can be determined by small trial runs. As stated above, the present foaming agent system provides a treating composition that has the desired foam properties deliverable using readily available and transportable low pressure equipment. Normally, treating compositions containing the present foam system can be applied at total pump pressures of less than 120 psi, preferably less than 100 psi and in a number of instances, at less than 90 psi.

The present foaming system is composed of at least one or a mixture of non-ionic alkyl polyglycosides. These alkyl glycosides are also referred to as alkyl (+β) mono or oligoglycopyranosides wherein the alkyl group is selected from $C_8$ to $C_{16}$ alkyl groups and mixtures thereof. The glycoside moiety may be a single unit (mono-) or a plurality of units of up to about 10 units (oligo-) These agents can be represented by the general formula:

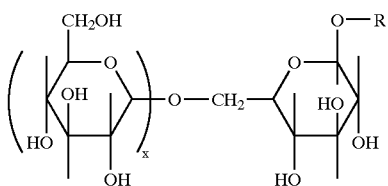

where R is a $C_8$–$C_{16}$ alky group such as octyl, nonyl, decyl, hendecyl, dodecyl, tridecyl, tetradecyl, pentadecyl, hexadedyl, heptadecyl or octadecyl which may have straight chain or branched chain structure and wherein x represents an integer of from 1 to 10.

The presently used alkyl polyglycosides can be formed according to the process described in U.S. Pat. Nos. 5,512,666; 5,633,359; 5,449,763; 5,859,218 and 5,266,690, the teachings of which are incorporated herein in their entirety by reference. Further, these agents are commercially available as aqueous solutions under the tradename Glucopon® of Henkel.

For a typical treating composition in accordance with the present invention, the foaming agent system usually comprises from about 0.5 to 5 weight percent, such as from about 1.5 to 2.5% by weight of the total composition. The alkypolyglycosides should be present in the subject digestion composition in from 0.5 weight percent to 5 weight percent, preferably from 1 to 4 weight percent based on the total composition. When used as the sole foaming agent, it is preferred that the alkylpolyglycoside agent(s) be present in from 1 to 3.5 weight percent, more preferably from 2 to 3.2 weight percent of the digestion treating composition.

The foaming system used as part of the present acidic digestion composition may be used in combination with certain other non-ionic foaming agents. The preferred additional non-ionic agents are non-ionic polyalkoxy compounds. Suitable additional non-ionic agents include compounds having at least about ten functional units (AO, where A is a $C_2$–$C_4$ hydrocarbon) per molecule of non-ionic agent, as for example, ethylene oxide-propylene oxide copolymers (e.g., those sold by BASF under the names PLURONIC or TETRONIC), polyalkylene oxide homopolymers, such as polyethylene glycol and the like, alcohol ethoxylates (e.g., those sold by Union Carbide under the name TERGITOL), or alkyl benzene ethoxylates (e.g., those sold under the name TRITON by Union Carbide). Additionally, ethoxylated silicones (e.g., those sold under the name SILWET by Witco) have been found to provide good performance when used in the present foaming agent system.

The additional non-ionic foaming agents suitable for use with the alkyl polyglycosides described above may contain minor amounts of cationic or anionic functionality within its molecular structure. Materials of this type include, for example, tallow amine ethoxylates which contain a single cationic group in the molecule having a plurality of alkylene oxide groups (e.g., RHODAMEEN IT-50 of Rhone-Poulenc which is a substantially non-ionic agent having approximately 50 moles of alkylene oxide functional groups (ethylene oxide) for each mole of functional amine group). The presence of small amounts of cationic or anionic groups in the additional foaming agent is acceptable provided they do not interfere with such agents non-ionic character. Thus, the resultant foam agent system may have cationic/anionic groups to non-ionic groups in a molar ratio of greater than 1:100, preferably greater than 1:110 and more preferably greater than 1:120.

When the alkylpolyglycoside(s) is used with an additional non-ionic foaming agent(s), as described above, the polyglycoside may be present in from 0.5 to 3 weight percent, preferably from 0.5 to 1.5 and most preferably from 0.75 to 1.25 weight percent based on the total composition. The additional agent is normally present in from 0.5 to 2, preferably from 0.5 to 1.25 and most preferably from 0.75 to 1.2 weight percent based on the total weight of the composition The present foaming system may be composed of one or a mixture of alkyl polyglycosides alone or further with an additional non-ionic agent described above. The preferred combination of agents is composed of a mixture of alkyl polyglycosides with a polyoxyalkylene compound having small amounts of cationic groups present. Such combination may be illustrated by the combination of a commercial product of GLUCOPAN available from Henkel, such as their Glucopon 425T which has R units of $C_8$, $C_{10}$, $C_{12}$, $C_{14}$ and $C_{16}$ in a proportion that the average value of R is from 9 to 12, such as about 10.3; with a commercial product of RHODAMEEN available from Rhone-Poulenc, such as their RHODAMEEN T-50. These combinations have the polyglycosides in from 0.5 to 2.5, such as 1.2 weight percent based on the weight of the total treating composition with the amine containing non-ionic polyalkylene oxide in from 0.5 to 2, such as 1 weight percent based on the weight of the total treating composition.

The present treatment composition may be readily applied to chrysotile asbestos containing cementitious coatings in any manner so that from about 8 to 20 parts by weight, preferably 9 to 15 parts by weight, of the aqueous treating composition is applied per part by weight of the chrysotile asbestos in the material being treated. The amount to be applied will depend on the amount of chrysotile asbestos initially present in the material, the concentration of the acid in the treating composition and the thickness and absorptive capacity of the material being treated. The exact amount can be readily determined by small scale application and testing.

When further occupancy of the building or treated area is planned, the treating composition, preferably, should contain agents which will inhibit the corrosion of metallic substrate materials (e.g., steel beams, galvanized corrugated decking, steel pipes and the like) to which the material being treated is attached and/or in vicinity thereof. It has been found that certain specific materials are useful in corrosion inhibiting agents for a broad spectrum of metals when part of the present acidic treating composition. These agents, and their incorporation in acidic treating compositions such as that described herein, which digest chrysotile asbestos to form a non-asbestos material and the utilization to transform the asbestos-containing cementitious material to a non-regulated material is fully described in U.S. Pat. No. 5,741,358, entitled COMPOSITION AND METHOD TO REMOVE ASBESTOS, the teachings of which are incorporated herein in its entirety by reference.

The method of the present invention transforms chrysotile asbestos-containing material into a material that contains very little, if any, chrysotile asbestos when measured, for example, by polarized light microscopy, X-ray diffraction, or other conventional methods. The resultant treated material contains less than one percent (1%), and normally less than one-half of one percent (0.5%) chrysotile asbestos in the overall structure of the resultant treated material. Thus, the material treated by the present composition results in a product which meets the U.S. governmental standards of a non-regulated asbestos-free material which may be safely handled by ordinary means. Further it has been unexpectedly found that the present composition and method provides this transformation without causing a degradation of the cementitious material and, thereby, permits the material to remain in place and to continue to provide the functions of fire resistance, etc. for which it was initially installed.

The application can be accomplished using a wand applicator having a small number (5–15) aerators in the wand. The treatment composition can be readily pumped through the wand using low pressure of less than about 120 psi such as is generated by small conventional pump(s). The aqueous treatment composition travels from the pump(s) to the applicator wand via a flexible hose which allows the individual making the application to readily apply the composition over a wide area without transferring the drum containing the treating composition.

The chrysotile asbestos contained in the cementitious material is substantially completely digested to provide a non-regulated product while in place and part of the cementitious material. Typically, at least about eighty five percent, and preferably at least about ninety percent, of the chrysotile fibers are digested by the present composition and method to provide a non-regulated, safe product without degradation of the cementitious material and, thereby, not require removal of the material nor detract from the properties of the cementitious coating material.

All that is necessary to achieve the digestion of the chrysotile asbestos fibers in accordance with the present invention is to apply the foamed treating composition of the present invention to the material containing the chrysotile fibers. In the case of asbestos-containing building materials, such as fireproofing materials coated on girders, beams and floor support plates, this can be done by spraying the foamed treating composition directly onto the asbestos-containing material, preferably while it is in place in the building environment. It is unnecessary to disturb the asbestos-containing materials in order to expose the asbestos fibers, since the foamed treating compositions typically will penetrate into the building materials and contact the asbestos fibers contained therein. Further, the foam composition provides a non-abrasive, pseudo-encapsulating means of treating the building material.

The present improved foamable treating composition can be applied using conventional low pressure (up to about 120, preferably up to about 90 psi) apparatus equipped with a small number (5–15) of aerators at the nozzle of the applicator wand.

The foam generated has a dense characteristic which exhibits good holding power with very low drainage (the release of liquid digestion composition from the foam away from the asbestos containing material). Thus, more of the active digestion composition is capable of being released into the porous structure of the asbestos containing material to which the foamed composition has been applied.

The present foamed treating composition should be applied to the gypsum-containing cementitious building material in manners which permit a total application of from about 100 to 200% by weight, preferably from about 125 to about 175% by weight, of the subject composition based on the weight of the cementitious building material. The exact amount will depend on the concentration of chrysotile asbestos in the building material treated.

Because of the high concentration of acid in the treating compositions of the invention, along with the catalytic presence of the fluoride ion source and the foaming agent system, the desired asbestos transformation may be achieved by a single application of the foamed treating composition on the building material while it is in place in the building environment. However, in some cases it may be necessary or desirable to make successive applications, preferably without any intermediate drying step, until the desired degree of digestion of the chrysotile asbestos is achieved.

The preferred manner of applying the foamed treating composition to the material is by applying the composition directly onto the major free surface(s) of the building material. As the material to be treated is in the form of a coating on a building component, usually one major surface is exposed and free for application of the subject composition. Application of a foamed aqueous treating composition provides an extended contact time and a pseudo-encapsulation of the material being treated while the transformation is occurring.

It has been found that when a chrysotile asbestos-containing material is transformed in place in accordance with the present invention, the physical integrity and adherence of the resulting non-asbestos material to the underlying substrate are such that it may be left in place to perform the fireproofing or other function for which the asbestos-containing material was originally installed. The resultant material subsequently may be treated by spraying or the like with a mild alkaline solution, such as sodium bicarbonate, calcium carbonate, sodium carbonate, magnesium hydroxide or the like in order to neutralize any remaining acid in the material.

Even though it has been found that building materials which have been treated in place with the present treating compositions to transform any asbestos contained therein to non-asbestos material essentially maintain their physical integrity and adherence to the underlying substrate, there are cases when it is necessary or desirable to strengthen the material or its adherence to the substrate. This can be accomplished by applying a polymeric binding agent to the material, either before the building material has been initially wet with the foamed treating composition or after the building material has been treated and/or neutralized as described above. The method of the invention, as applied to the treatment of asbestos in buildings, may typically include the step of removing any obstructions, such as interior partitions, ceilings and column covers, to expose the asbestos-containing material to be treated. This will enable the sampling and testing of the material to determine its composition and other relevant characteristics, thereby facilitating the selection of an optimum asbestos treatment composition and treatment procedure in accordance with the invention. The foamed treatment composition is then applied directly to the asbestos-containing material while in place in amounts described above to provide a non-regulated material. The resultant material may be further treated with a neutralizing agent.

The following examples are intended to illustrate the invention without imposing limits on the invention, as defined by the claims appended hereto. All parts and percentages by weight unless otherwise indicated.

EXAMPLE 1

An aqueous master batch of asbestos treating composition was formed containing 32.5 weight percent phosphoric acid, 1.6 weight percent ammonium hexafluorosilicate and 0.05 weight percent of diethylthiouria (corrosion inhibitor) was formed. To respective portions of this master batch was added foaming agents of (a) 3 weight percent of the sample of master batch of a mixture of non-ionic $C_8$, $C_{10}$, $C_{12}$, $C_{14}$ and $C_{16}$ alkyl polyglycosides having an average alkyl chain of 10.3 (Sample A); (b) a mixture of 1.2 weight percent of the mixture of alkyl polyglycosides used to form Sample A with 1 weight percent of a non-ionic agent composed of tallow amine ethoxylate having 50 ethylene oxide units per mole (Sample B); and, for comparative purposes, (c) a mixture of 4 weight percent of the non-ionic tallow amine ethoxylate used in Sample B with 0.3 weight percent of a cationic dodecylamidopropyl betaine (a mixture disclosed in U.S. Pat. No. 5,743,841)(Example C).

Foams were formed from each mixture by pumping each of the resultant mixtures through a series of aerator elements (1.252 cm. SMV static mixing elements of Koch Engineering Co.).

Samples A and B were pumped using a 2:1 ratio air compression piston pump. The liquid flow rate was 4.7 liters per minute while maintaining a pressure of 90 to 100 psi. The liquid was injected with air just before the aerator elements. The air was delivered at 40 to 55 psi at a volume of $0.05 m^3$/min (1.7 cfm) through 15 aerator elements. The resultant foam products had densities ranging from 77 gm/l to 114 gm/l.

Sample C was pumped using a 10:1 ratio air compression piston pump. The liquid flow rate was 4.7 Liters per minute at a pressure of 500 psi. The liquid flow was injected with air just before the mixing elements at 90 psi at a volume of 0.05 $m^3$/min. (1.7 cfm). To produce a suitable foam the components were required to be mixed using 30 aerator elements described above under high pressure. The resultant foam had densities of from 94 gm/l to 114 gm/l. Sample C did not provide good foams under the low pressures and low amount of elements used with respect to Samples A and B above.

Each of the foams was sprayed into previously tared Buchner funnels. The foam containing funnels were immediately weighed to determine the density of the foam being tested. Each funnel was placed over tared Erlenmeyer flasks and allowed to drain for 15 minutes. The flasks were then weighed to determine the amount of liquid which drained from each sample.

In each instance the samples exhibited substantially no drainage for several minutes. Each sample had about 50 weight percent drainage after 15 minutes under these test conditions.

Samples A and B were able to provide foam products which exhibited equal drainage under the test conditions as that of prior art Sample C. When the samples were applied to porous asbestos containing material having a thickness of about 1.9 to 2.5 cm, Samples A and B absorbed into the material equally well as Sample C and was observed to provide treating material throughout the thickness of the material.

The results are given in Table 1 below and in FIG. 1.

| | % Drainage Starting Density vs. Drainage at 15 min. | | |
|---|---|---|---|
| Density lb/gal | Sample A | Sample B | Sample C |
| 0.68 | | 55.03 | |
| 0.72 | 50.40 | | |
| 0.74 | 53.18 | | |
| 0.77 | | 51.78 | |
| 0.78 | | | 55.48 |
| 0.81 | 49.50 | | |
| 0.83 | | | 56.52 |
| 0.84 | | 50.55 | |
| 0.85 | | 51.33 | |
| 0.92 | | | 58.88 |
| 0.94 | 54.29 | | |
| 0.95 | | | 57.28 |

EXAMPLE 2

The master treating composition described in Example 1 above was used to form foam samples using (a) only the alkyl polyglycoside, described in Example 1 above in dosages of 2.2 weight percent (Sample D) and 1.2 weight percent (Sample E); (b) a combination of alkyl polyglycoside and tallow amine ethoxylate, as described in Example 1 above (Sample F); (c) a comparative combination of 1.2 weight percent of the betaine with 1 weight percent of the tallow amine ethoxylate (Sample G) and (d) a comparative sample of 1 weight percent tallow amine ethoxylate (Sample H).

Each of the foams were subjected to a regimen of high shear forces over an extended period of time. A blender was used to provide the shear forces and was applied in thirty second intervals with five second rest periods in between. At the end of each of the five second rest periods, the foam height was measured in millimeters. The shear was applied for the first, second, third and fourth periods at 3,400 rpm; the fifth period at 4,250 rpm; the sixth period at 8,550 rpm; the seventh period at 13,600 rpm; the eight period at 16,400 rpm; and the ninth and tenth periods at 19,250 rpm.

The results show stable foams (high foam heights) can be achieved with the present non-ionic foam systems. That the use of alkyl polyglycosides alone or combined with another non-ionic foaming agent provide good foam stability. The use of only another non-ionic foam agent (herein illustrated by tallow amine ethoxylate) exhibits poor stability. Finally, the present combination (Sample F) is comparable in stability to the illustrative cationic/non-ionic system of U.S. Pat. No. 5,743,841 (Sample G).

What is claimed is:

1. A method of treating a chrysotile-asbestos containing porous building material (ACM) installed on a substrate in a building, comprising:

(a) providing a composition derived from admixing (i) water, (ii) at least about 30% by weight of an acid component comprising an inorganic acid, an inorganic acidic salt or mixtures thereof, (iii) from about 0.1 to about 4% by weight of a source of fluoride ions, and (iv) a stable foam generating amount of a foaming agent system comprising at least one non-ionic polyalkyglycoside represented by the formula:

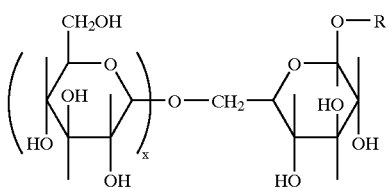

wherein R represents a $C_8$ to $C_{16}$ alkyl group and x represents an integer of from 1 to 10, alone or further with a second non-ionic agent;

(b) foaming the composition from step (a);

(c) applying the resulting foamed composition to the ACM chrysotile asbestos-containing building material;

(d) permitting the foamed composition to remain on and penetrate the building material and contact the chrysotile asbestos contained therein;

(e) allowing said composition to remain in contact with the chrysotile asbestos for a sufficient period of time to reduce the amount of chrysotile asbestos contained in said building material to less than 1% by weight of the resultant material; and (f) permitting said resultant material to remain on the substrate of the building.

2. A method of treating a chrysotile asbestos-containing porous building material (ACM) installed on a substrate in a building comprising:

(a) providing an admixture composition derived by admixing (i) water, (ii) at least about 10 weight percent of at least one hexafluorosilicate or tetrafluoroborate salt of ammonia, alkali metal, alkaline earth metal or mixtures of said salts, (iii) up to about 7 weight percent of an inorganic acid, an inorganic acid salt or mixtures thereof, and (iv) a stable foam generating amount of a foaming agent system comprising at least one non-ionic polyalkyglycoside represented by the formula:

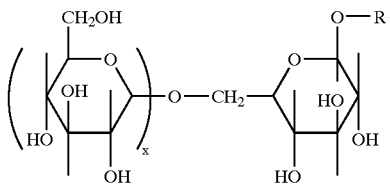

wherein R represents a $C_8$ to $C_{16}$ alkyl group and x represents an integer of from 1 to 10, alone or further with a second non-ionic agent;

(b) foaming the composition from step (a);

(c) applying the resulting foamed composition to the ACM chrysotile asbestos-containing building material;

(d) permitting the foamed composition to remain on and penetrate the building material and contact the chrysotile asbestos contained therein;

(g) allowing said composition to remain in contact with the chrysotile asbestos for a sufficient period of time to reduce the amount of chrysotile asbestos contained in said building material to less than 1% by weight of the resultant material; and (h) permitting said resultant material to remain on the substrate of the building.

3. The method of claim 1 or 2 wherein the building material is a gypsum-containing cementitious building material in the form of a coating on a building component substrate.

4. The method of claim 1 or 2 wherein the foaming agent system comprises a mixture of at least one polyalkyglycoside and at least one non-ionic agent selected from polyalkoxy compounds having at least about 10 alkoxy groups per molecule.

5. The method of claim 1 or 2 wherein the foaming agent system consists essentially of at least one polyalkyglycoside.

6. The method of claim 1 or 2 wherein the
polyalkyglycoside is present in from 0.5 to 3 weight percent of the composition of (a) and the second non-ionic foaming agent is present in from 0.5 to 2 weight percent of the composition of (a).

7. The method of claim 1 wherein the acid component comprises phosphoric acid present in a concentration of from about 30 to about 45 weight percent and the source of fluoride ions comprises an ammonium or alkali metal fluorosilicate or fluoroborate present in a concentration of from about 0.5 to about 2 percent by weight based on the total weight of said composition.

8. The method of claim 1 wherein the source of fluoride is selected from a fluorosilicate or fluoroborate salt of an alkali metal, alkaline earth metal or ammonia.

9. The method of claim 2 wherein the composition is derived by admixing (a) water, (b) at least one hexafluorosilicate salt of ammonia, alkali metal or alkaline earth metals or mixtures thereof, and (c) up to about 7% by weight based on the weight of the composition of an inorganic acid, an inorganic acidic salt or mixtures thereof, wherein the hexafluorosilicate is present in at least about 10 weight percent of the composition.

10. The method of claim 2 wherein the composition is derived by admixing (a) water, (b) at least one tetrafluoroborate salt of ammonia, alkali metal or alkaline earth metals or mixtures thereof, and (c) up to about 7% by weight base on the weight of the composition of an inorganic acid, an inorganic acidic salt or mixtures thereof wherein the tetrafluoroborate is present in at least about 10 weigh percent of the composition.

11. The method of claim 1 or 2 wherein the foam generating system comprises from about 0.75 to 1.25 weight percent of the composition of the alkylpolyglycoside and from about 0.75 to 1.2 of a second nonionic foaming agent.

12. The method of claim 1 or 2 wherein the alkyl chain of the polyglycosides is a mixture of $C_8$, $C_{10}$, $C_{12}$, $C_{14}$ and $C_{16}$ with an average alkyl chain length of from about 9 to 12.

13. The method of claim 12 wherein a second non-ionic foaming agent is present and said agent is a tallow amine ethoxylate having from 40 to 60 alkylene oxide groups per mole.

* * * * *